(12) United States Patent  (10) Patent No.: US 8,750,195 B2
Koo et al.  (45) Date of Patent: Jun. 10, 2014

(54) SYSTEM AND METHOD FOR MULTIPLE RELAY NODE OPERATION IN A COMMUNICATIONS SYSTEM

(75) Inventors: Changhoi Koo, Plano, TX (US); Zhigang Rong, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 351 days.

(21) Appl. No.: 12/796,240

(22) Filed: Jun. 8, 2010

(65) Prior Publication Data

US 2010/0315957 A1  Dec. 16, 2010

Related U.S. Application Data

(60) Provisional application No. 61/185,827, filed on Jun. 10, 2009.

(51) Int. Cl.
    *H04B 7/14*  (2006.01)

(52) U.S. Cl.
    USPC ............................. 370/315; 370/329; 370/332

(58) Field of Classification Search
    None
    See application file for complete search history.

(56) References Cited

U.S. PATENT DOCUMENTS

| 2008/0019321 | A1* | 1/2008 | Kim et al. | 370/332 |
| 2008/0144552 | A1* | 6/2008 | Johansson et al. | 370/310 |
| 2009/0003225 | A1* | 1/2009 | Klassen et al. | 370/250 |
| 2010/0034135 | A1* | 2/2010 | Kim et al. | 370/315 |
| 2010/0118989 | A1* | 5/2010 | Sayana et al. | 375/260 |
| 2010/0195599 | A1* | 8/2010 | Zhang et al. | 370/329 |
| 2010/0285792 | A1* | 11/2010 | Chen et al. | 455/422.1 |
| 2012/0147805 | A1* | 6/2012 | Kim et al. | 370/312 |
| 2012/0218937 | A1* | 8/2012 | Chen et al. | 370/328 |

FOREIGN PATENT DOCUMENTS

| CN | 101282204 A | 10/2008 |
| CN | 101394665 A | 3/2009 |
| WO | WO 2007/064249 A1 | 6/2007 |

OTHER PUBLICATIONS

Cewit, et al., "WF on Relaying operation for LTE-A," R1-091098, 3GPP TSG-RAN WG1 #58, Feb. 9-13, 2009, 2 pages, Athens, Greece.
Alcatel-Lucent, et al., "Way forward on Type II relay," R1-092264, May 29, 2009, 3 pages.
Vodafone, et al., "Type II relay frame-work definition," R1-091632, May 29, 2009, 2 pages.
International Search Report and Written Opinion of the Patent Cooperation Treaty received in International Application No. PCT/CN2010/073763 mailed Aug. 26, 2010, 12 pages.
First Chinese Office Action with Partial English Translation received in Chinese Application No. 20100823807.7 mailed May 6, 2013, 11 pages.

* cited by examiner

*Primary Examiner* — Andrew Lai
*Assistant Examiner* — Leon Andrews
(74) *Attorney, Agent, or Firm* — Slater & Matsil, L.L.P.

(57) ABSTRACT

A method for communications controller operation that includes receiving a report from a communications node served by a communications controller, the report includes channel measurements of channels between the communications node and neighboring communications devices, establishing a cooperative operation for the communications node with communications devices neighboring the communications node based on the received report, and transmitting information to communications devices in the cooperative operation. The neighboring communications devices in the cooperative operation forward the information to the communications node.

20 Claims, 9 Drawing Sheets

SYSTEM AND METHOD FOR MULTIPLE RELAY NODE OPERATION IN A COMMUNICATIONS SYSTEM

This application claims the benefit of U.S. Provisional Application No. 61/185,827, filed on Jun. 10, 2009, entitled "System and Method for Multiple Relay Nodes Operation in a Wireless Communications System," which application is hereby incorporated herein by reference.

TECHNICAL FIELD

The present invention relates generally to a system and method for wireless communications, and more particularly to a system and method for multiple relay node operation in a communications system.

BACKGROUND

Generally, a relay node (RN) is considered as a tool to improve, e.g., the coverage of high data rates, group mobility, temporary network deployment, the cell-edge throughput and/or to provide coverage in new areas, the performance of a communications system. The RN is wirelessly connected to a communications system via a donor cell (also referred to as a donor enhanced Node B (donor eNB or D-eNB)). The RN may serve as an eNB to one or more user equipment (UE). To UE that is being served by the RN, the RN may appear identical to an eNB, scheduling uplink (UL) and downlink (DL) transmissions to the UE over an access link, which is between the RN and the UE. When a UE is served by more than one RN, cooperative multipoint transmission/reception (CoMP) may be made by the multiple RNs which may help to provide cooperative gain and improve the performance of the UE.

SUMMARY OF THE INVENTION

These and other problems are generally solved or circumvented, and technical advantages are generally achieved, by preferred embodiments of the present invention which provides for multiple relay node operation in a communications system.

In accordance with a preferred embodiment of the present invention, a method for communications controller operation is provided. The method includes receiving a report from a communications node served by a communications controller, the report includes channel measurements of channels between the communications node and neighboring communications devices, establishing a cooperative operation for the communications node with communications devices neighboring the communications node based on the received report, and transmitting information to communications devices in the cooperative operation. The communications devices in the cooperative operation forward the information to the communications node.

In accordance with another preferred embodiment of the present invention, a method for communications controller operation is provided. The method includes transmitting a first packet to a plurality of relay nodes. The plurality of relay nodes is participating in a cooperative operation with a communications node. The method also includes receiving responses from the relay nodes in the plurality of relay nodes. The responses include indications of the relay nodes' ability to decode the transmission of the first packet. The method further includes transmitting a second packet to the plurality of relay nodes in response to determining that the responses indicate that no relay node in the plurality of relay nodes were able to decode the transmission of the first packet, wherein the second packet contains information of the first packet, and transmitting a third packet to the plurality of relay nodes in response to determining that at least one of the responses indicates that at least one of the relay nodes in the plurality of relay nodes was able to decode the transmission of the first packet.

In accordance with another preferred embodiment of the present invention, a communications controller is provided. The communications controller includes a receiver, a transmitter, a memory, and a controller coupled to the receiver, to the transmitter, and to the memory. The receiver is coupled to a receive antenna in order to receive signals detected by the receive antenna, and the transmitter is coupled to a transmit antenna in order to transmit signals with the transmit antenna, and the memory stores channel information reported by a communications node served by the communications controller. The controller establishes a cooperative operation for the communications node served by the communications controller. The cooperative operation is established based on the channel information reported by the communications node.

An advantage of an embodiment is that multiple RNs may be used to enhance throughput of UEs through CoMP, especially for UEs located at cell-edges or coverage holes.

A further advantage of an embodiment is that HARQ operation for access link and backhaul link involving RNs are provided.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Third Generation Partnership Project (3GPP) Long Term Evolution (LTE) compliant communications system operating with multiple RNs serving UEs, providing CoMP transmission/reception. The invention may also be applied, however, to other communications systems supporting multiple RNs serving UEs and providing CoMP transmission/reception, such as 3GPP LTE-Advanced, WiMAX, and so forth, compliant communications systems.

Figure 1:
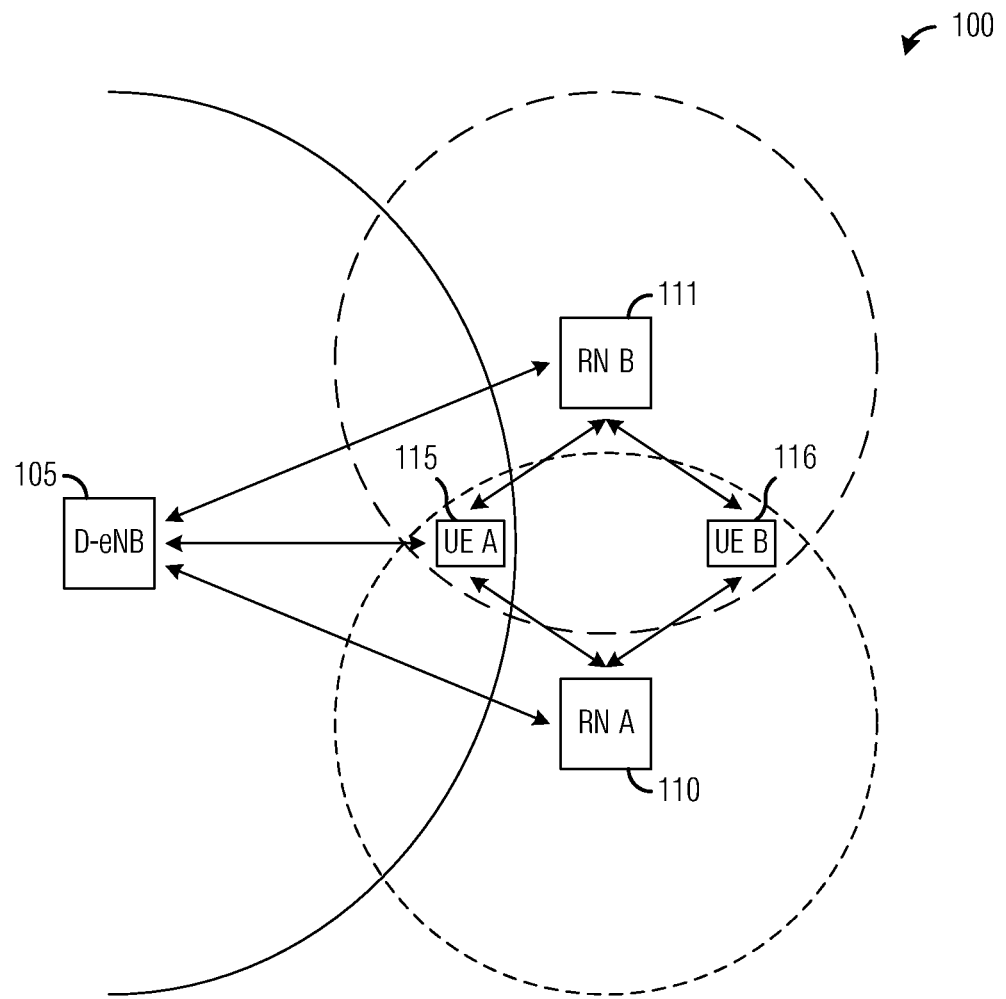
FIG. 1 is a diagram of a wireless communications system.

FIG. 1 illustrates a wireless communications system 100. Wireless communications system 100 includes a D-eNB 105 and a RN A 110 and a RN B 111. RN A 110 and RN B 111 may be connected over a wireless backhaul link to D-eNB 105 using network resources controlled by D-eNB 105. The wireless connection between D-eNB 105 and RN A 110 and RN B 111 may be referred to as a backhaul. RN A 110 and RN B 111 belong to D-eNB 105 and may receive transmission grants (network resources) from D-eNB 105.

Wireless communications system 100 also includes UE A 115 and UE B 116. UE A 115 and UE B 116 may be wirelessly connected to both RN A 110 and RN B 111. The wireless connections between UE A 115 and UE B 116 and RN A 110 and RN B 111 may be referred to as access links. Furthermore, in addition to access links, UE A 115 may be wirelessly connected to D-eNB 105, however, the wireless connection between UE A 115 and D-eNB 105 may simply be a control channel connection with no data traffic being conveyed over the wireless connection.

UE A 115 may be located within a zone wherein it is capable of receiving transmissions both RN A 110 and RN B 111, therefore it may be possible to improve the performance of UE A 115 by transmitting multiple instances of the same data, thereby utilizing CoMP to achieve cooperative gain, to UE A 115. For example, in an urban area having scattered coverage holes due to a large number of buildings, multiple RNs may be used to fill out the coverage holes. These multiple RNs may have overlapping coverage areas and UEs located within the overlapping coverage areas may be able to take advantage of the multiple RNs by receiving transmissions from the multiple RNs.

Figure 2:
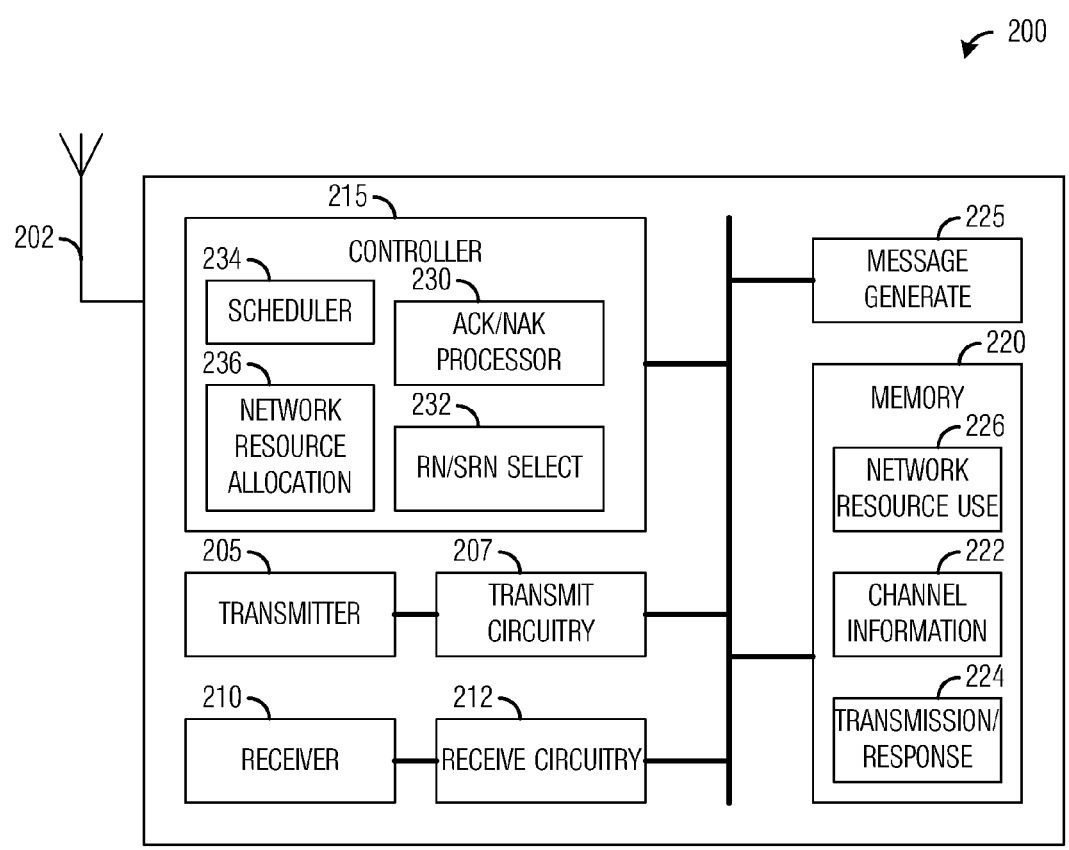
FIG. 2 is a diagram of a D-eNB.

FIG. 2 illustrates a D-eNB 200. D-eNB 200 may be representative of an eNB of a communications system that is donating a portion of its network resources to one or more RNs operating within its service area. D-eNB 200 may control communications to UEs served by D-eNB 200, with some communications being transmitted directly to the UEs by D-eNB 200 and some communications being relayed through the one or more RNs. In addition to donating a portion of its network resources to the one or more RNs, D-eNB 200 may also participate in HARQ transmissions with the one or more RNs to help ensure that transmissions are received by the UEs without error or if an error occurs, recovery from the error is provided.

D-eNB 200 may have at least one antenna 202. Generally, two or more antennas are required to provide multiple input, multiple output (MIMO) operation, but since the one or more RNs may participate in CoMP transmission/reception, D-eNB 200 may not necessarily require more than one antenna. Antenna 202 may serve as both a transmit antenna and a receive antenna. Alternatively, D-eNB 200 may have separate transmit and receive antennas. D-eNB 200 may also have a wireline connection, such as a backhaul connection to other network components, such as to other eNBs, base stations, MMEs, and so forth. Coupled to antenna 202 may be a transmitter 205 used to transmit information over the air using antenna 202. Transmitter circuitry 207 coupled to transmitter 205 may provide signal processing for information being transmitted. Examples of signal processing provided by transmitter circuitry 207 may include filtering, amplifying, modulating, error encoding, parallel-to-serial converting, interleaving, bit puncturing, and so forth.

Also coupled to antenna 202 may be a receiver 210 used to receive information detected by antenna 202. Receiver circuitry 212 coupled to receiver 210 may provide signal processing for received information. Examples of signal processing provided by receiver circuitry 212 may include filtering, amplifying, demodulating, error detecting and correcting, serial-to-parallel converting, de-interleaving, and so on. As used herein, transmitter 205 and receiver 210 may be a wireless transmitter and receiver as well as a wireline transmitter and receiver.

As used herein, receiver and transmitter may apply to both wireless and wireline receivers and transmitters. Therefore, the use of receiver and/or transmitter should not be construed as being limiting to either the scope or spirit of the embodiments.

A controller 215 may be a processing unit, such as a general purpose microprocessor, a special purpose microprocessor, a micro controller, an application specific integrated circuit, a digital signal processor, and so forth, responsible for executing applications and programs, controlling operations of various components of D-eNB 200, allocating network resources to RNs and UEs, scheduling transmission opportunities for UEs, and so on. As discussed previously, D-eNB 200 may transmit information directly to UEs or through RNs. When multiple RNs are used to transmit information to UEs, there may be an opportunity to utilize CoMP transmission/reception to improve the performance of the UEs. Furthermore, HARQ transmission may be used to improve transmission performance in the presence of errors as well as improve error recovery performance. To support controller 215 in serving UEs, D-eNB 200 includes a memory 220 and message generate unit 225.

Memory 220 may be used to store information and applications. For example, memory 220 may be used to store channel information provided by UEs (as well as RNs) served by D-eNB 200. The channel information, which may include channel measurements made by the UEs and RNs, and fed-back to D-eNB 200 in the form of channel state information, precoding matrix indicators, and so forth, may be stored in channel information store 222. The channel information may be used by D-eNB 200 to select RNs for UEs, serving relay nodes (SRNs), and so forth.

Also stored in memory 220 may be HARQ responses to transmissions made by D-eNB 200 (stored in transmission/response store 224). As an example, for each transmission made by D-eNB 200, a receiver(s) of the transmission may respond with either an ACK to indicate that it successfully decoded the transmission or a NAK to indicate that it was not successful in decoding the transmission. Since the transmission may have multiple recipients, D-eNB 200 may need to store the responses to the transmission so that they do not get mixed up. Additionally, ACK/NAKs from SRNs may be given more weight than ACK/NAKs from regular RNs and the ACK/NAKs from SRNs may be stored since they may have an impact on the behavior of D-eNB 200 in future transmissions.

Furthermore, a network resource use store 226 may be used to store information regarding network resources allocated to RNs operating in the coverage area of D-eNB 200. In addition to storing information about which network resources are allocated for RN usage, network resource use store 226 may store historical information about an amount or percentage of allocated network resources actually used by the RNs. The historical information may be further broken down into usage per time of day, traffic class, priority, network load, and so on. The information stored in network resource use store 226 may be used to allocate network resources to RNs.

Memory 220 may be implemented as read-only memories (ROMs), random access memories (RAMs), flash memories, erasable ROMs, or a combination thereof. For example, applications, which generally do not need to be changed and may need to be maintained while power is not being provided to D-eNB 200 may be stored in ROMs or erasable ROMs. Similarly, channel information and transmission/response information may need to be regularly updated and may not need to be stored except when D-eNB 200 is operating may be stored in RAMs.

Message generate unit 225 may be used to generate messages from information to be transmitted. The messages generated by message generate unit 225 may be transmitted via transmitter 205 of D-eNB 200. The messages generated by message generate unit 225 may follow specific formatting requirements, such as those specified by a technical standard.

Controller 215 may include an ACK/NAK processor 230, a RN/SRN select unit 232, a scheduler 234, and a network resource allocation unit 236. ACK/NAK processor 230 may be used to process received HARQ transmissions from recipients of transmissions made by D-eNB 200. For example, if a transmission is made to multiple recipients, ACK/NAK processor 230 may process ACK/NAK transmissions from each of the multiple recipients to determine if the transmission was successfully received. If all recipients report ACKs then the transmission was successfully received, while if one of the recipients was a SRN and the SRN reports an ACK while one of the other recipients report a NAK, the report from the SRN may supersede the NAK from the other recipient, and so forth. ACK/NAK processor 230 may be implemented as a multi-input combinatorial logic unit with an input for each possible recipient. The combinatorial logic in ACK/NAK processor 230 may apply a weighting corresponding to the relative weight given to the sources of the HARQ transmissions.

RN/SRN select unit 232 may be used to select RNs or SRNs to serve a particular UE. The RNs or SRNs selected may be based on channel information reported by the RNs and UEs and stored in channel information store 222. For a UE, RN/SRN select unit 232 may select RNs or SRNs corresponding to channels with best available channel information. RN/SRN select unit 232 may use the channel information provided by the UEs stored in channel information store 222 to determine which possible RNs or SRNs may serve a UE, then RN/SRN select unit 232 may select the RNs or SRNs from the possible RNs or SRNs using some sort of selection criteria, such as fairness, maximum throughput, or so on. In addition to channel information, selection of RNs or SRNs may also be based on a number of UEs already being served by the possible RNs or SRNs, a priority of the UE, or so forth.

RN/SRN select unit 232 may also be used to establish a cooperative operation for UEs. Based on the channel information reported by the UEs, RN/SRN select unit 232 may communicate to the RNs in the channel information reported by the UEs to establish the cooperative operation with willing RNs. Furthermore, RN/SRN select unit 232 may select one or more of the willing RNs for SRN operation. As an example, RN/SRN select unit 232 may select the RN with the highest channel information to operate as a SRN.

Scheduler 234 may be used to schedule transmission opportunities for UEs. Scheduling of transmission opportunities may be based on factors such as UE priority, information priority, quality of service requirements, past service history of the UEs, network traffic load, time of day, buffer/queue load, and so on. Scheduler 234 may make use of a scheduling function to select UEs to schedule, selecting UEs that maximize (or minimize) the scheduling function.

Since D-eNB 200 donates a part of its network resources to RNs operating within its coverage area, network resource allocation unit 236 may determine an allocation of network resources to the RNs operating within the coverage area of D-eNB 200. The allocation of network resources may simply be a static allocation or network resource allocation unit 236 may make use of historical information stored in network resource use store 226 to dynamically alter the allocation of network resources to the RNs based on considerations such as time of day, network load, traffic pattern, traffic priority, and so on. Furthermore, network resource allocation unit 236 may make use of HARQ transmission ACK/NAKs to adjust the network resource allocation. As an example, if the number of ACKs is high, network resource allocation unit 236 may increase network resource allocation to increase throughput. Similarly, if the number of NAKs is high, network resource allocation unit 236 may decrease or maintain network resource allocation to reduce network resource allocation waste. Reducing network resource allocation may force the use of a less aggressive modulation and coding scheme to reduce data rate while increasing data protection.

Detailed discussions of operations of D-eNB 200 are provided below.

Figure 3:
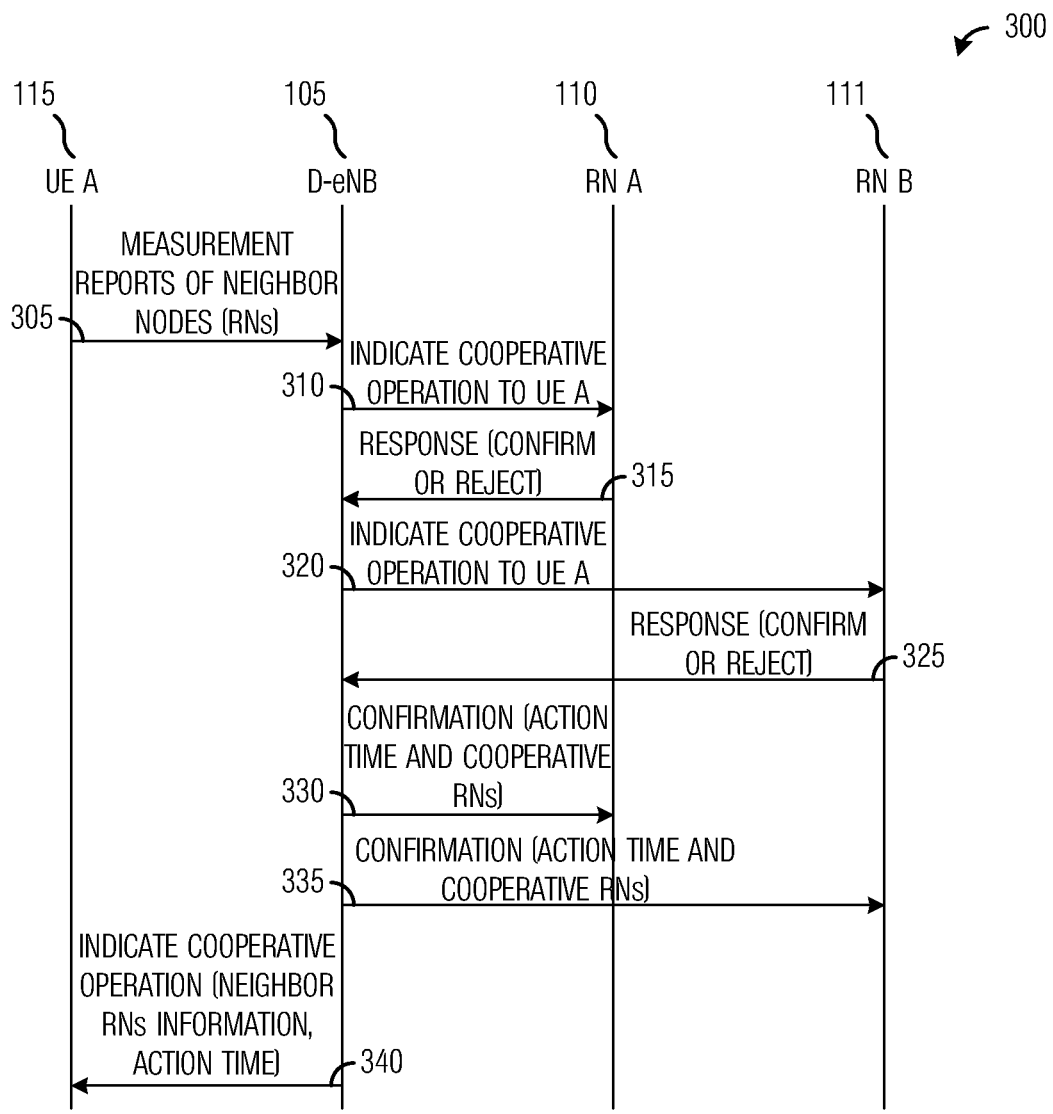
FIG. 3 is a diagram of a call exchange in an initial setup.

FIG. 3 illustrates a call exchange 300 in an initial setup. Call exchange 300 may begin when a UE, such as UE A 115, joins a wireless communications system, such as wireless communications system 100. UE A 115 may participate in call exchange 300 when it has moved into a coverage area of wireless communications system 100, powered on within the coverage area, reset while in the coverage area, and so forth. UE A 115 may transmit measurement reports of neighbor nodes, for example, RNs to a D-eNB, such as D-eNB 105 (transmission 305). According to an embodiment, the measurement reports may include channel quality measurements made by UE A 115. Alternatively, the channel quality measurements may be quantized to reduce feedback overhead, and may be sent to D-eNB 105 in the form of channel state information, channel quality indicators, precoding matrix indices, and so forth.

Based on the measurement reports of neighbor nodes from UE A 115, D-eNB 105 may transmit an indication of cooperative operation to each RN provided by UE A 115. For example, if the measurement reports of neighbor nodes from UE A 115 indicate that RN A 110 and RN B 111 serve the current location of UE A 115, then D-eNB 105 may transmit a radio resource control (RRC) message to RN A 110 (transmission 310) and RN B 111 (transmission 320). The RRC messages may include timing information, involved neighbor RNs information, and so forth, to be used in cooperative operation.

If UE A 115 reports a significant number of RNs in its measurement reports, then D-eNB 105 may select a subset of the RNs reported as candidates for cooperative operation. The selection may be based on a reported access link quality between each of the RNs and UE A 115. For example, D-eNB 105 may select the two or three (or more) RNs having the highest reported access link quality. Alternatively, D-eNB 105 may select all RNs with reported access link quality exceeding a specified threshold.

A SRN may be a RN that has an added capability of forwarding ACK/NACK transmissions to D-eNB 105. A reduction in overall network traffic may be achieved if not all RNs have the capability of forwarding ACK/NACK transmissions to D-eNB 105. Therefore, D-eNB 105 may select a subset of a total number of RNs operating in cooperative operation for UE A 115 to operate as SRN while the remaining RNs simply operate as regular RNs.

If UE A 115 reports a significant number of RNs, D-eNB 105 may select one or more RNs for SRN operation. For example, if UE A 115 reports feedback pertaining to the link quality of the access link between each RN and UE A 115, then D-eNB 105 may select the RN(s) having the best access link quality or the RNs with access link quality above a specified threshold. Alternatively, D-eNB 105 may select the RN(s) based on a quality of a backhaul link connecting each RN to D-eNB 105. In yet another alternative, D-eNB 105 may select the RN(s) based on a combined quality of both its backhaul link with D-eNB 105 as well as its access link with UE A 115.

D-eNB 105 may then expect to receive responses from RN A 110 and RN B 111 (and other RNs if RRC messages are sent to other RNs) indicating if they will participate in cooperative operation (transmission 315 from RN A 110 and transmission 325 from RN B 111). In general, D-eNB 105 may negotiate with candidate RNs prior to indicating cooperative operation to UE A 115. Negotiation with candidate RNs may further include sending confirmations that may include action times and cooperative RNs to the candidate RNs (transmissions 330 and 335, respectively).

D-eNB 105 may then send a RRC message to UE A 115 to indicate the identity of RNs that agree to participate in cooperative operation with UE A 115 (transmission 340). The RRC message may include RN information, action time, other timing information, and so forth. Call exchange 300 may then terminate.

Figure 4:
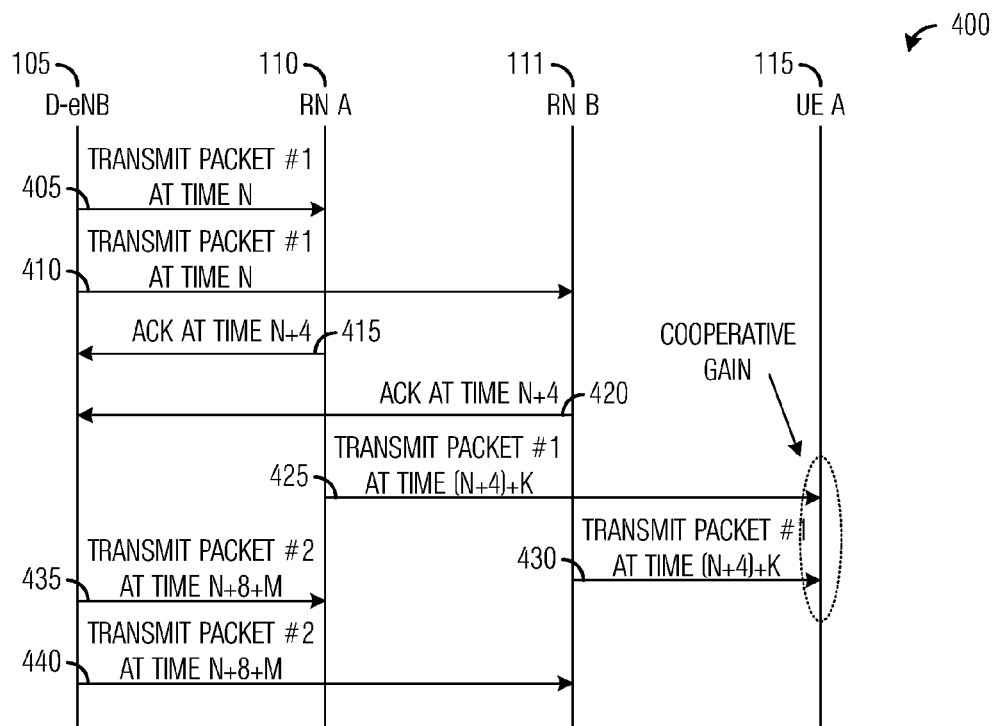
FIG. 4 is a diagram of a call exchange in a joint transmission for cooperative gain over a backhaul.

FIG. 4 illustrates a call exchange 400 in a joint transmission for cooperative gain over a backhaul. As shown in FIG. 4, transmissions from multiple RNs (two RNs, RN A 110 and RN B 111, in FIG. 4) may be combined at a UE (UE A 115) to improve UE performance. Call exchange 400 may begin with a D-eNB, such as D-eNB 105, transmitting a packet (packet #1, for example) at time N to RN A 110 and RN B 111 (transmissions 405 and 410, respectively). For discussion purposes, let a time be relative to a subframe time and that a maximum of four (4) subframes may occur between successive transmissions or responses for received transmissions.

As RN A 110 and RN B 111 receives the transmission of packet #1, they will attempt to decode the transmission. The decoding of the transmission will either be successful (transmission succeed) or unsuccessful (transmission failed) and the RNs will respond according as part of a hybrid automatic repeat request (HARD) operation. For example, if both RN A 110 and RN B 111 successfully decoded the transmission of packet #1, then they will return ACK transmissions at time N+4 to D-eNB 105 (transmissions 415 and 420).

RN A 110 and RN B 111 may also transmit packet #1 to UE A 115 at time N+4+K, wherein K is a processing time at a RN (transmissions 425 and 430). A value of K may be dependent on factors such as system performance, system capacity, system load, and so forth. UE A 115 may receive multiple signals of the same information (packet #1), from which it may obtain cooperative gain by combining the multiple signals. D-eNB 105 may then transmit packet #2 to RN A 110 and RN B 111 at time N+8+M, wherein M is a processing time (transmissions 435 and 440). Call exchange 400 may continue as long as D-eNB 105 has additional information to transmit to UE A 115, else call exchange 400 may terminate.

Figure 5:
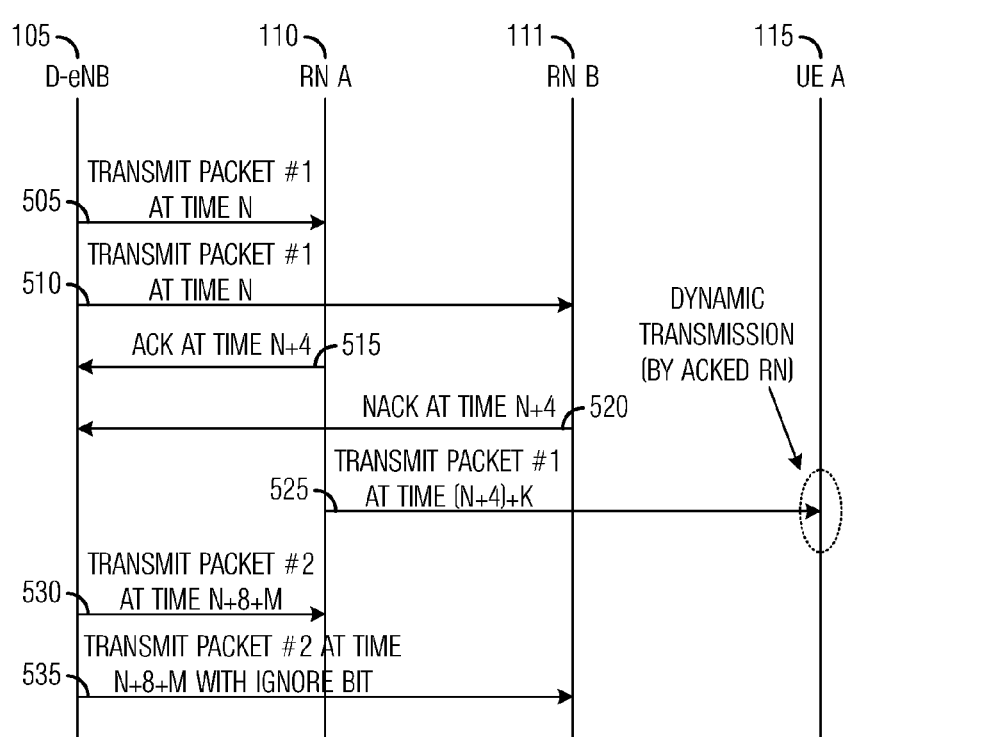
FIG. 5 is a diagram of a call exchange in a dynamic transmission over a backhaul link.

FIG. 5 illustrates a call exchange 500 in a dynamic transmission over a backhaul link. As shown in FIG. 5, not all transmissions over a backhaul link may be successfully decoded. D-eNB 105 may begin by transmitting packet #1 to RN A 110 and RN B 111 at time N (transmissions 505 and 510). As the RNs receive the transmission of packet #1, they will attempt to decode the transmission. As shown in FIG. 5, RN A 110 was able to successfully decode the transmission but RN B 111 was not able to successfully decode the transmission. Hence, RN A 110 transmits an ACK back to D-eNB 105 at time N+4 (transmission 515) and RN B 111 transmits a NACK back to D-eNB 105 at time N+4 (transmission 520).

Since only RN A 110 was able to successfully decode the transmission of packet #1, only RN A 110 transmits packet #1 to UE A 115 at time N+4+K, where K is a processing time (transmission 525). Since UE A 115 only receives a single instance of packet #1, it may not be able to obtain cooperative gain.

Because D-eNB 105 received at least one ACK in response to its transmission of packet #1, D-eNB 105 may continue by transmitting packet #2 to RN A 110 and RN B 111 at time N+8+M, where M is a processing time (transmissions 530 and 535). However, since RN B 111 was not able to successfully decode the transmission containing packet #1, it is expecting a retransmission of packet #1. To indicate to RN B 111 that the transmission contains packet #2 and not packet #1, an indicator bit (an IGNORE bit) may be set to a specified value and included in transmission 535. Call exchange 500 may continue as long as D-eNB 105 has additional information to transmit to UE A 115, else call exchange 500 may terminate.

Figure 6:
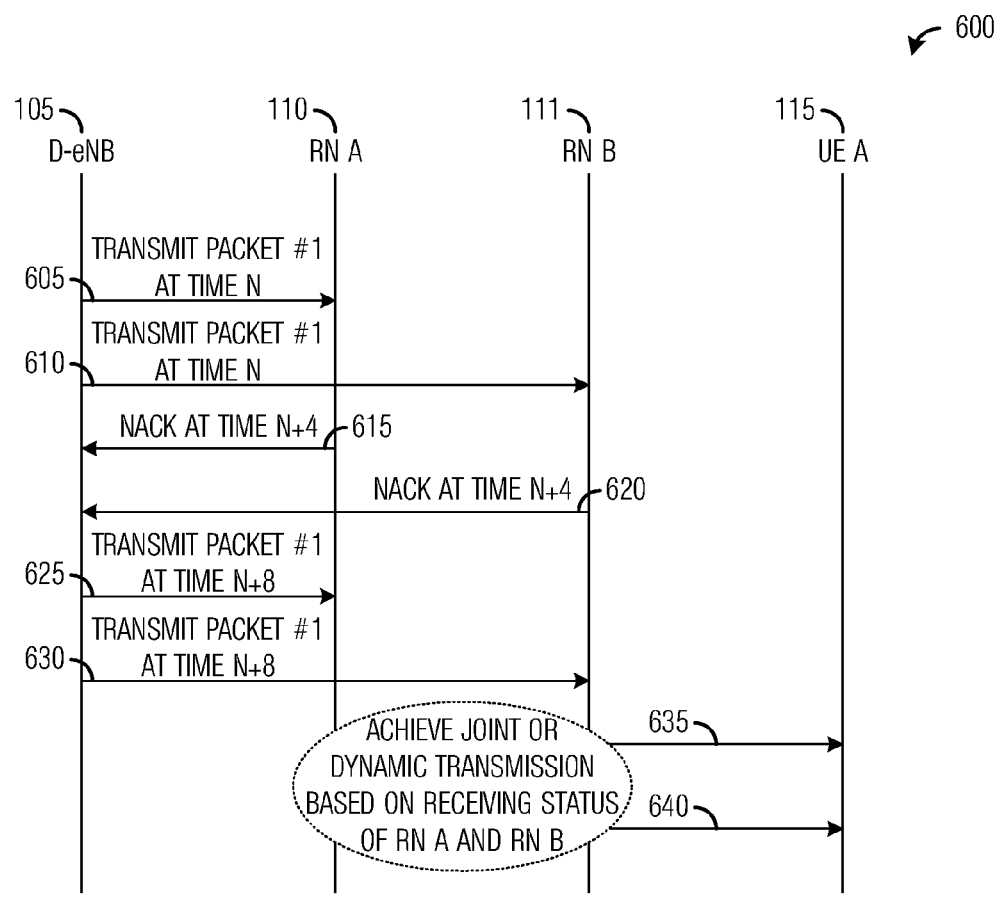
FIG. 6 is a diagram of a call exchange in a recovery over a backhaul link.

FIG. 6 illustrates a call exchange 600 in a recovery over a backhaul link. If all RNs receiving a transmission of a packet are unsuccessful in decoding the transmission, then recovery is needed. D-eNB 105 may begin by transmitting packet #1 to RN A 110 and RN B 111 at time N (transmissions 605 and 610). As the RNs receive the transmission of packet #1, they will attempt to decode the transmission. As shown in FIG. 6, neither RN A 110 nor RN B 111 were able to successfully decode the transmission. Hence, RN A 110 and RN B 111 transmit a NACK back to D-eNB 105 at time N+4 (transmissions 615 and 620).

Since neither RN A 110 nor RN B 111 were able to successfully decode the transmission, neither RNs may transmit packet #1 to UE A 115. Furthermore, because D-eNB 105 received all NACKs arising from its transmission of packet #1, D-eNB 105 may retransmit packet #1 to both RN A 110 and RN B 111 at time N+8 (transmissions 625 and 630). Eventually, either RN A 110 or RN B 111 or both may be able to successfully decode the transmission of packet #1 and transmit packet #1 to UE A 115. If only one RN is able to successfully decode the transmission, then only one RN will be able to transmit packet #1 to UE A 115 (transmission 635) in a dynamic transmission. If both RNs are able to successfully decode the transmission, then both RNs will be able to transmit packet #1 to UE A 115 (transmissions 635 and 640) in a cooperative operation. Call exchange 600 may continue as long as D-eNB 105 has additional information to transmit to UE A 115, else call exchange 600 may terminate.

Figure 7:
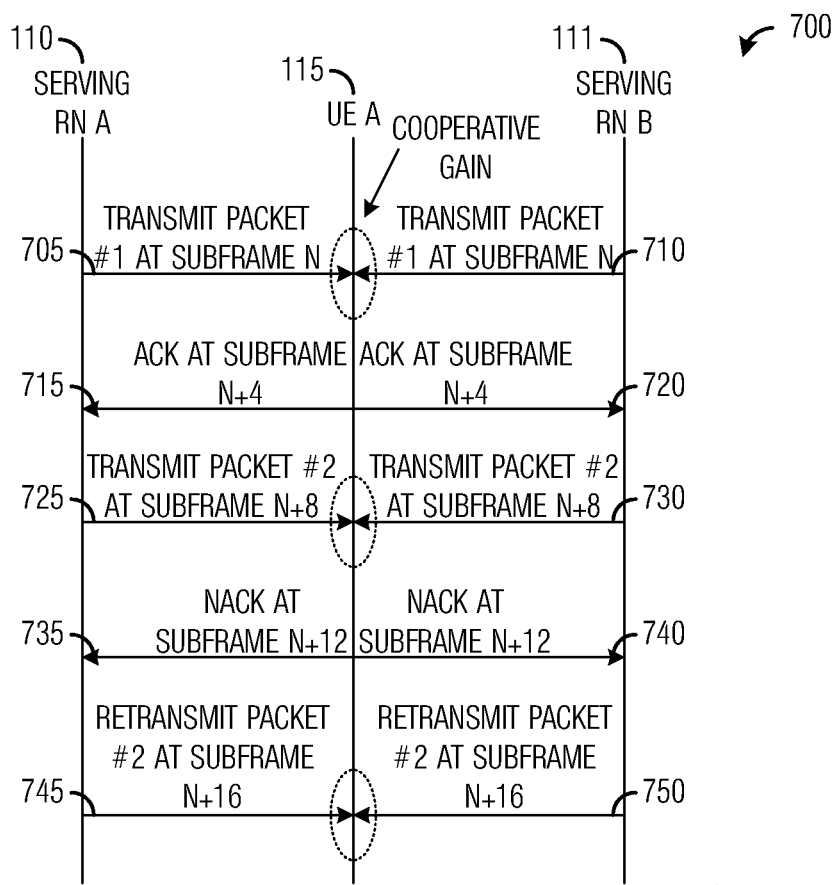
FIG. 7 is a diagram of a call exchange occurring in an access link with multiple serving RNs.

FIG. 7 illustrates a call exchange 700 occurring in an access link with multiple serving RNs (SRNs). A SRN may be a RN responsible for forwarding ACK/NACK transmissions from a UE to a D-eNB, while a RN may not. As shown in FIG. 6, both RN A 110 and RN B 111 may be SRNs. As a UE, such as UE A 115, receives a transmission of packet #1 at time N from RN A 110 and RN B 111 (transmissions 705 and 710), it will attempt to decode both transmissions in a cooperative fashion, thus achieving cooperative gain. Additionally, UE A 115 may return ACK transmissions to RN A 110 and RN B 111 at time N+4 to inform the RNs of its successful decoding of transmissions (transmissions 715 and 720). RN A 110 and RN B 111 may forward the ACK transmissions to D-eNB 105 since both RN A 110 and RN B 111 are SRNs.

However, if UE A 115 is not able to successfully decode transmissions, such as transmissions of packet #2 at time N+8 from RN A 110 and RN B 111 (transmissions 725 and 730), then UE A 115 may return NACK transmissions to RN A 110 and RN B 111 at time N+12 to inform the RNs of its inability to decode the transmissions (transmissions 735 and 740). Although not shown, RN A 110 and RN B 111 may forward the NACK transmissions to D-eNB 105. Then, D-eNB 105 may repeat the transmission of packet #2 to UE A 115, resulting in the forwarding of packet #2 to UE A 115 (transmissions 745 and 750). Call exchange 700 may continue as long as D-eNB 105 has additional information to transmit to UE A 115, else call exchange 700 may terminate.

Figure 8:
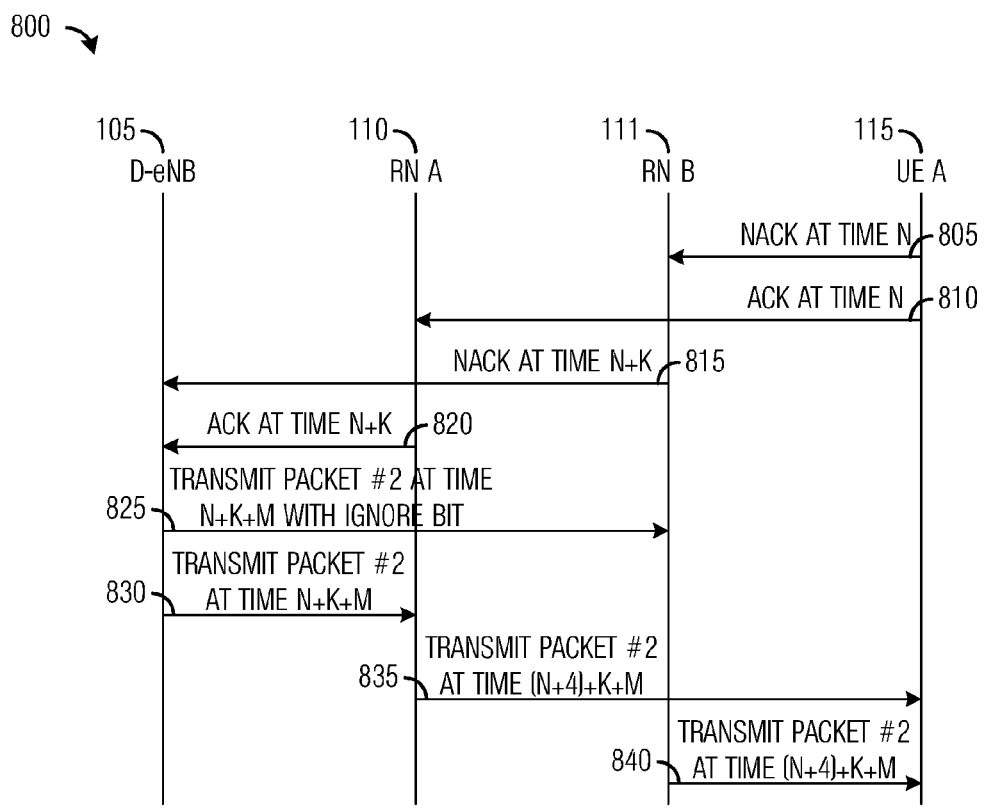
FIG. 8 is a diagram of a call exchange occurring in an access link with multiple SRNs.

FIG. 8 illustrates a call exchange 800 occurring in an access link with multiple SRNs. As UE A 115 decodes transmissions (for example, transmission of packet #1) that it receives from RN A 110 and RN B 111, it is able to decode a transmission from RN A 110 but not a transmission from RN B 111. As a result, UE A 115 transmits a NACK transmission to RN B 111 at time N (transmission 805) and an ACK transmission to RN A 110 at time N (transmission 810). RN A 110 and RN B 111 forward the ACK/NACK transmissions to D-eNB 105 at time N+K (transmissions 815 and 820).

Since D-eNB 105 received at least one ACK transmission arising from its transmission of packet #1, D-eNB 105 transmits packet #2 to UE A 115 (transmission 825 and 830). Since UE A 115 sent a NACK transmission indicating that it was not able to successfully decode the transmission from RN B 111, D-eNB 105 sets an indicator bit (such as IGNORE bit) to a specified value in its transmission of packet #2 to RN B 111 (transmission 825), while its transmission of packet #2 to RN A 110 does not include the set indicator bit (transmission 830). RN A 110 and RN B 111 may forward the transmission of packet #2 to UE A 115 (transmissions 835 and 840). Call exchange 800 may continue as long as D-eNB 105 has additional information to transmit to UE A 115, else call exchange 800 may terminate.

Figure 9:
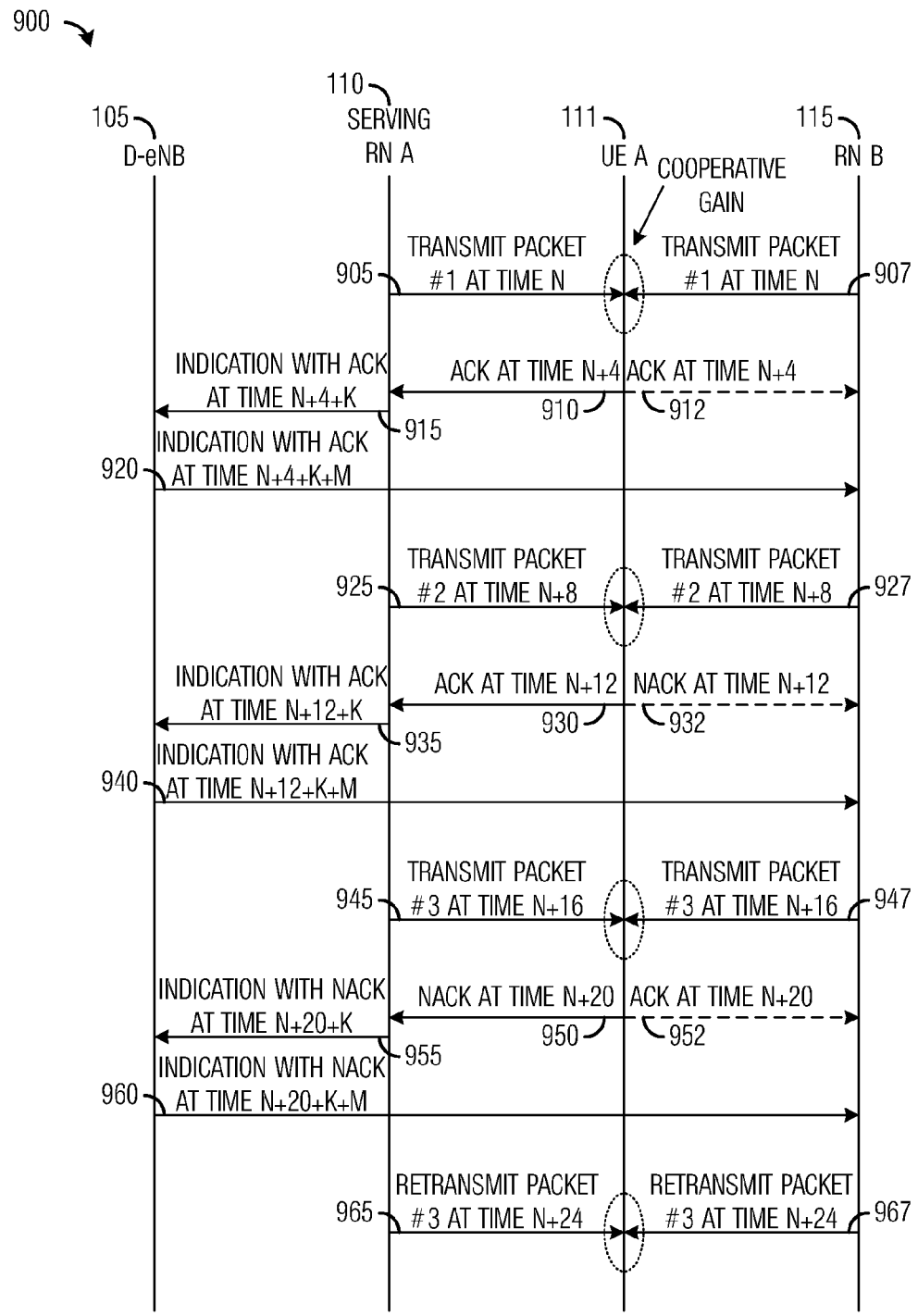
FIG. 9 is a diagram of a call exchange occurring in an access link with a single SRN.

FIG. 9 illustrates a call exchange 900 occurring in an access link with a single SRN. As shown in FIG. 9, RN A 110 is a SRN and RN B 111 is a regular RN, which means that only RN A 110 will forward ACK/NACK transmissions to D-eNB 105. Although the discussion focuses on RN A as a SRN and RN B 111 as a regular RN, a similar call exchange exists if RN A 110 is a regular RN and RN B 111 is a SRN.

After receiving a transmission of packet #1 from D-eNB 105, RN A 110 and RN B 111 may forward the transmission of packet #1 to UE A 115 at time N (transmissions 905 and 907). As UE A 115 receives the transmissions, it may begin to decode the transmissions. For discussion purposes, let UE A 115 be successful in decoding the transmissions from both RN A 110 and RN B 111. Resulting from the successful decoding, UE A 115 may transmit ACK transmissions back to RN A 110 and RN B 111 at time N+4 (transmissions 910 and 912). Transmission 912 is shown as a dashed line since after it arrives at RN B 111, it will not be forwarded on to D-eNB 105 since RN B 111 is a regular RN and incapable of forwarding ACK/NACK transmissions to D-eNB 105.

However, RN A 110 is a SRN and capable of forwarding ACK/NACK transmissions to D-eNB 105. RN A 110 may forward the ACK transmission from UE A 115 to D-eNB 105 at time N+4+K, where K is a processing time (transmission 915). Since RN B 111 does not forward ACK/NACK transmissions, D-eNB 105 may transmit an indication with an ACK to RN B 111 at time N+4+K+M, where K and M are processing times. RN B 111 may follow the indication from D-eNB 105 and ignore the ACK/NACK transmission from UE A 115 in transmission 912 (transmission 920).

Since D-eNB 105 receives at least one ACK transmission in response to its transmission of packet #1, D-eNB 105 may continue with the transmission of packet #2 at time N+8 (transmissions 925 and 927). As UE A 115 receives the transmissions of packet #2, it may begin to decode the transmissions. For discussion purposes, let UE A 115 be successful in decoding the transmission from RN A 110 and unsuccessful in decoding the transmission from RN B 111. Resulting from the decoding, UE A 115 may transmit an ACK transmission back to RN A 110 and a NACK transmission back to RN B 111 at time N+12 (transmissions 930 and 932).

Since only RN A 110 forwards ACK/NACK transmissions, RN A 110 forwards the ACK transmission to D-eNB 105 at time N+12+K (transmission 935). Since RN B 111 does not forward ACK/NACK transmissions, D-eNB 105 may transmit an indication with an ACK to RN B 111 at time N+12+K+M (transmission 940).

Since D-eNB 105 receives at least one ACK transmission in response to its transmission of packet #2, D-eNB 105 may continue with the transmission of packet #3 at time N+16 (transmissions 945 and 947). As UE A 115 receives the transmissions of packet #3, it may begin to decode the transmissions. For discussion purposes, let UE A 115 be unsuccessful in decoding the transmission from RN A 110 and successful in decoding the transmission from RN B 111. Resulting from the decoding, UE A 115 may transmit a NACK transmission back to RN A 110 and an ACK transmission back to RN B 111 at time N+20 (transmissions 950 and 952).

Since only RN A 110 forwards ACK/NACK transmissions, RN A 110 forwards the NACK transmission to D-eNB 105 at time N+20+K (transmission 955). Since RN B 111 does not forward ACK/NACK transmissions, D-eNB 105 may transmit an indication with a NACK to RN B 111 at time N+20+K+M (transmission 960).

Since D-eNB 105 received a NACK transmission in response to its transmission of packet #3, D-eNB 105 may repeat the transmission of packet #3 at time N+24 (transmissions 965 and 967). Call exchange 900 may continue as long as D-eNB 105 has additional information to transmit to UE A 115, else call exchange 900 may terminate.

Figure 10A:
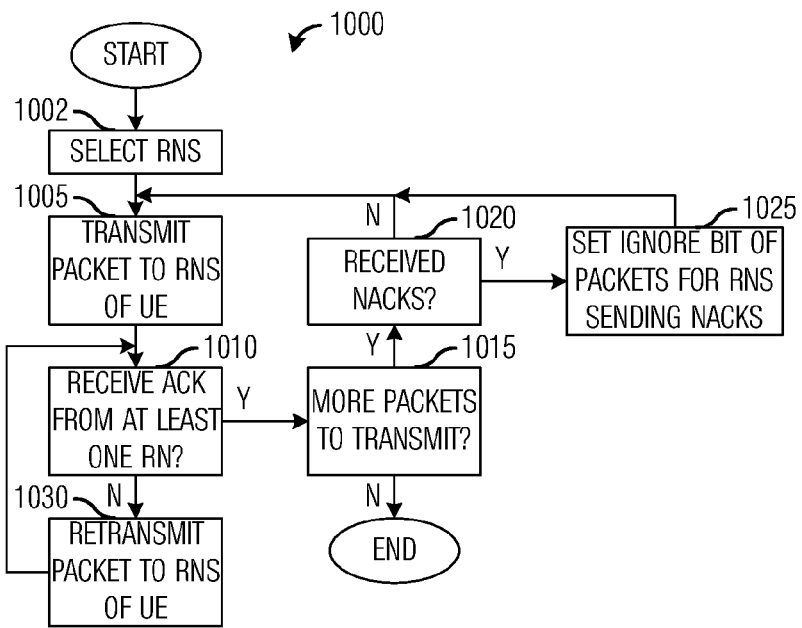
FIG. 10a is a flow diagram of D-eNB operations in transmitting packets to a UE.

FIG. 10a illustrates a flow diagram of D-eNB operations 1000 in transmitting packets to a UE. D-eNB operations 1000 may be indicative of operations taking place in a D-eNB, such as D-eNB 105, transmitting packets to a UE, such as UE A 115, through two or more RNs, such as RN A 110 and RN B 111, to enable cooperative gain through cooperative operation. D-eNB operations 1000 may be in operation when the UE is in a hot spot that is being served by more than one RN.

D-eNB operations 1000 may begin with selecting the RNs (block 1002). As discussed previously, selecting the RNs may be based on information provided by the UE in its measurement reports. The measurement reports may contain link quality information of RNs that the UE may be able to detect. D-eNB operations 1000 may then continue with the D-eNB transmitting a packet, such as packet #1 to the UE (block 1005). However, instead of transmitting packet #1 directly to the UE, the D-eNB transmits to the multiple RNs serving the UE. The D-eNB may then receive ACK/NACK transmissions from the multiple RNs, wherein the ACK/NACK transmissions may include an indicator of the RN's ability to decode the transmission of packet #1. Alternatively, the ACK/NACK transmissions may include an indicator of the UE's ability to decode the transmission of packet #1. The D-eNB may perform a check to determine if it has received at least one ACK transmission from the multiple RNs (block 1010).

If the D-eNB has received at least one ACK transmission from the multiple RNs, then the D-eNB may deem that the transmission has succeeded and may perform a check to determine if it has additional packets to transmit to the UE (block 1015). If the D-eNB does not have any more packets to transmit to the UE, then D-eNB operations 1000 may terminate.

If the D-eNB has more packets to transmit, then the D-eNB may perform a check to determine if it has received any NACK transmissions from the multiple RNs (block 1020). If it has, then it may set an indicator bit (such as the IGNORE bit) to a specified value in next transmissions that it will send to those RNs from the multiple RNs that sent NACK transmissions (block 1025). The D-eNB may then send the next packet to the UE through the multiple RNs (block 1005). If it had not received any NACK transmissions (block 1020), then the D-eNB may directly send the next packet to the UE through the multiple RNs (block 1005).

If the D-eNB received only NACK transmissions from the multiple RNs (block 1010), then the D-eNB may retransmit the packet to the UE through the multiple RNs (block 1030). The D-eNB may then return to block 1010 to wait for the incoming ACK/NACK transmissions.

Figure 10B:
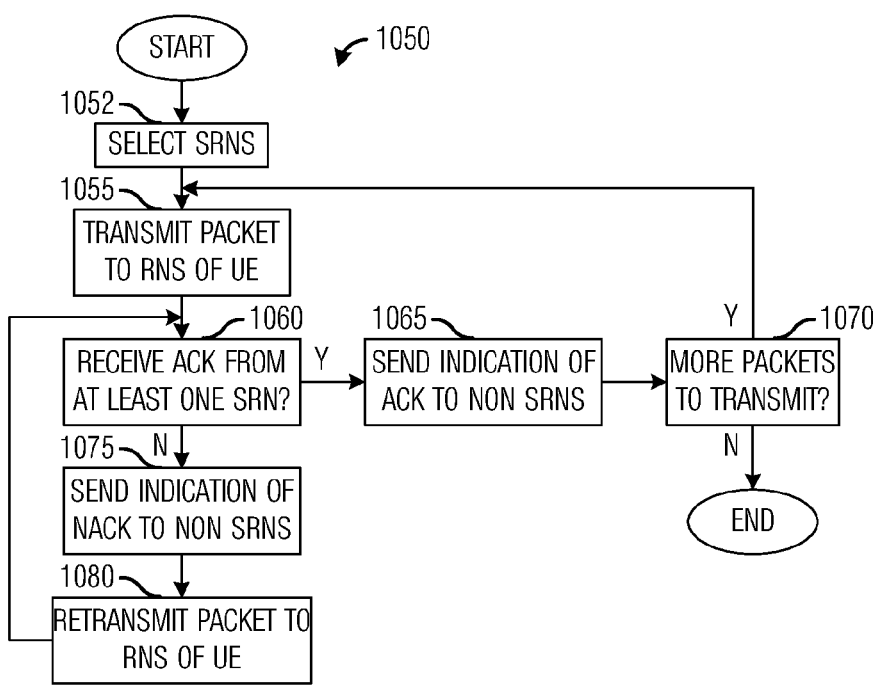
FIG. 10b is a flow diagram of D-eNB operations in transmitting packets to a UE through more than one RN, where at least one RN is a regular RN.

FIG. 10*b* illustrates a flow diagram of D-eNB operations 1050 in transmitting packets to a UE through more than one RN, where at least one RN is a regular RN. D-eNB operations 1050 may be indicative of operations taking place in a D-eNB, such as D-eNB 105, transmitting packets to a UE, such as UE A 115, through two or more RNs, such as RN A 110 and RN B 111, to enable cooperative gain through cooperative operation, where at least one of the RNs is a SRN and the remaining RNs are regular RNs. D-eNB operations 1050 may be in operation when the UE is in a hot spot that is being served by more than one RN.

D-eNB operations 1050 may begin with selecting the at least one SRN (block 1052). The selecting of the at least one SRN may be based on link quality information of a communications link between the RNs and the UE or a communications link between the D-eNB and the RNs or both communications links as discussed previously. D-eNB operations may then continue with the D-eNB transmitting a packet, such as packet #1 to the UE (block 1055). However, instead of transmitting packet #1 directly to the UE, the D-eNB transmits to the multiple RNs serving the UE. The D-eNB may then receive ACK/NACK transmissions from the at least one SRNs, wherein the ACK/NACK transmission includes an indicator of the UE's ability to decode the transmission of packet #1 from the at least one SRNs. The D-eNB may perform a check to determine if it has received at least one ACK transmission from the at least one SRNs (block 1060).

If the D-eNB has received at least one ACK transmission from the at least one SRNs, then the D-eNB may deem that the transmission has succeeded. The D-eNB may then transmit an indication of an ACK to regular RNs in the multiple RNs (block 1065) and may perform a check to determine if it has additional packets to transmit to the UE (block 1070). If the D-eNB does not have any more packets to transmit to the UE, then D-eNB operations 1050 may terminate.

If the D-eNB has more packets to transmit, then the D-eNB may then send the next packet to the UE through the multiple RNs (block 1055).

If the D-eNB received only NACK transmissions from the at least one SRNs (block 1060), then the D-eNB may then transmit an indication of a NACK to regular RNs in the multiple RNs (block 1075) and retransmit the packet to the UE through the multiple RNs (block 1080). The D-eNB may then return to block 1060 to wait for the incoming ACK/NACK transmissions.

Advantageous features of embodiments of the invention may include: A method of controller operation, the method comprising, transmitting a first packet to a plurality of relay nodes (RNs), wherein the plurality of RNs forwards the first packet to a mobile node (MN); receiving responses from each RN in the plurality of RNs, wherein a response from each RN comprises an indication of the MN's ability to decode the transmission of the first packet forwarded by the RN; retransmitting the first packet to the plurality of RNs in response to determining that all responses from the plurality of RNs indicated that the MN was not able to decode the transmissions of the first packet forwarded by the RNs in the plurality of RNs, wherein the plurality of RNs forwards the first packet to the MN; and transmitting a second packet to the plurality of RNs in response to determining that at least one of the responses from the plurality of RNs indicated that the MN was able to decode the transmission of the first packet forwarded by the plurality of RNs, wherein the plurality of RNs forwards the second packet to the MN. The method could further include, wherein responses from a subset of RNs in the plurality of RNs indicated that the MN was not able to decode the transmission of the first packet forwarded by RNs in the subset of RNs, and wherein transmitting a second packet comprises setting an indicator bit of transmissions of the second packet to RNs in the subset of RNs, wherein the indicator bit indicates that the RNs in the subset of RNs ignore the MN's inability to decode the transmission of the first packet. The method could further include, wherein the indicator bit further indicates that the MN ignores the MN's inability to decode the transmission of the first packet. The method could further include, further comprising: receiving measurement reports from the MN, wherein the measurement reports comprises a list of RNs detectable by the MN; and negotiating with RNs in the list of RNs to join the plurality of RNs. The method could further include, wherein the measurement reports comprises link quality information related to a communications link between the MN and the RNs in the list of RNs, and wherein negotiating with RNs comprises negotiating with RNs having link quality information above a threshold. The method could further include, wherein the measurement reports comprises link quality information related to a communications link between the MN and the RNs in the list of RNs, and wherein negotiating with RNs comprises negotiating with M RNs with the M highest link quality information, where M is an integer number.

Advantageous features of embodiments of the invention may include: A method for controller operation, the method comprising, transmitting a first packet to a plurality of relay nodes (RNs), wherein the plurality of RNs forwards the first packet to a mobile node (MN); receiving a response from a serving relay node (SRN), wherein the response from the SRN comprises an indication of the MN's ability to decode the transmission of the first packet forwarded by the SRN; transmitting a message comprising the indication to a subset of RNs from the plurality of RNs, wherein the subset of RNs comprises RNs in the plurality of RNs that is not the SRN; retransmitting the first packet to the plurality of RNs in response to determining that the indication indicated that the MN was not able to decode the transmission of the first packet forwarded by the SRN, wherein the plurality of RNs forwards the first packet to the MN; and transmitting a second packet to the plurality of RNs in response to determining that the indication indicated that the MN was able to decode the transmission of the first packet forwarded by the SRN, wherein the plurality of RNs forwards the second packet to the MN. The method could further include, further comprising: receiving measurement reports from the MN, wherein the measurement reports comprises link quality information of RNs detectable by the MN; and selecting the SRN from the RNs detectable by the MN based on the link quality information of the RNs detectable by the MN. The method could further include, wherein selecting the SRN comprises selecting a RN from the RNs detectable by the MN, wherein the RN has a greatest link quality information for a communications link between the RN and the MN. The method could further include, wherein selecting the SRN comprises selecting a RN from the RNs detectable by the MN, wherein the RN has a greatest link quality information for a communications link between the RN and the controller. The method could further include, wherein selecting the SRN comprises selecting a RN from the RNs detectable by the MN, wherein the RN has a greatest link quality information for a first communications link between the RN and the controller and a second communications link between the RN and the MN Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications controller operation, the method comprising:
    receiving a report from a communications node served by a communications controller, the report comprising a plurality of channel measurements for a plurality of channels between the communications node and two or more neighboring relay nodes;
    establishing, between the communications controller and the two or more neighboring relay nodes, a cooperative operation for communicating data to the communications node; and
    transmitting, by the communications controller, a first data packet and a first scheduling information to the two or more neighboring relay nodes in accordance with the cooperative operation, wherein the first scheduling information specifies a first time period in which the two or more neighboring relay nodes are scheduled to simultaneously transmit the first data packet to the communications node using a coordinated multipoint (CoMP) transmission technique in accordance with the cooperative operation, and wherein the first data packet is not communicated over an air interface between the communications node and the communications controller.

2. The method of claim 1, wherein the report comprises channel information regarding the channels, and wherein the channel information comprises channel state information, channel quality measurements, channel quality indicators, or a combination thereof.

3. The method of claim 1, wherein establishing the cooperative operation comprises:
    selecting the two or more neighboring relay nodes from a plurality of neighboring relay nodes;
    sending a cooperative operation request to each of the two or more neighboring relay nodes;
    receiving responses from the two or more neighboring relay nodes; and
    adding the two or more neighboring relay nodes to the cooperative operation upon receiving the responses.

4. The method of claim 3, wherein selecting the two or more neighboring relay nodes comprises selecting relay nodes in accordance with the report.

5. The method of claim 3, wherein selecting the two or more neighboring relay nodes comprises identifying channels in the plurality of channels having channel information that exceeds a threshold, and selecting relay nodes in the plurality of neighboring relay nodes in accordance with the identified channels.

6. The method of claim 5, wherein identifying channels in the plurality of channels comprises identifying those channels having highest channel information.

7. The method of claim 3, wherein establishing a cooperative operation further comprises denoting one of the two or more neighboring relay nodes as a serving relay node.

8. The method of claim 7, wherein the plurality of channel measurements indicate a channel quality for each channel in the plurality of channels, and wherein denoting one of the two or more neighboring relay nodes comprises denoting, as the serving relay node, one of the two or more neighboring relay nodes that is associated with a channel in the plurality of channels having a highest channel quality.

9. The method of claim 7, further comprising receiving an indicator from the serving relay node, wherein the indicator indicates the neighboring relay node's ability to decode the information.

10. The method of claim 3, further comprising sending identity information related to the two or more neighboring relay nodes participating in the cooperative operation to the communications node.

11. The method of claim 1, wherein the two or more neighboring relay nodes forward the information to the communications node by coordinating, between the two or more neighboring relay nodes, a joint transmission of the information to the communications node.

12. A transmission device comprising:
a processor; and
a non-transitory computer readable storage medium storing programming for execution by the processor, the programming including instructions to:
establish a cooperative operation with two or more relay nodes for communicating data to a receiving device; and
transmitting a first data packet and a first scheduling information to the two or more relay nodes in accordance with the cooperative operation, wherein the first scheduling information specifies a first time period in which the two or more relay nodes are scheduled to simultaneously transmit the first data packet to the receiving device using a coordinated multipoint (CoMP) transmission technique in accordance with the cooperative operation, and wherein the first data packet is not communicated over an air interface between the transmission device and the receiving device.

13. The transmission device of claim 12, wherein the programming further includes instructions to:
receive channel measurements for a plurality of channels between the receiving device and a plurality of relay nodes; and
select, in accordance with the channel measurements, the two or more relay nodes out of the plurality of relay nodes for participating in the cooperative operation.

14. The transmission device of claim 13, wherein the channel measurements comprise a channel quality for each of the plurality of channels, and wherein the instructions to select the two or more relay nodes includes instructions to select the two or more relay nodes associated with the channels in the plurality of channels having highest channel quality.

15. A first relay node comprising:
a processor; and
a non-transitory computer readable storage medium storing programming for execution by the processor, the programming including instructions to:
establish a cooperative operation with a transmitting device and at least a second relay node, the cooperative operation for communicating data to a receiving device;
receive a first data packet and a first scheduling information from the transmitting device, the first scheduling information specifying a first time period in which the first relay node and the second relay node are scheduled to simultaneously transmit the first data packet to the receiving device using a coordinated multipoint (CoMP) transmission technique in accordance with the cooperative operation; and
coordinate, with the second relay node, a joint transmission of the first data packet to the receiving device during the first time period, wherein the first data packet is not communicated over an air interface between the transmission device and the receiving device.

16. A receiving device comprising:
a processor; and
a non-transitory computer readable storage medium storing programming for execution by the processor, the programming including instructions to:
generate channel measurements for two or more channels between the receiving device and two or more relay nodes;
transmit the channel measurements to a transmitting device, wherein the transmitting device establishes a cooperative operation with the two or more relay nodes upon receiving the channel measurements; and
receive a data packet in accordance with a joint transmission by the two or more relay nodes, wherein the data packet is communicated to the two or more relay nodes by the transmitting device in accordance with the cooperative operation, and wherein the data packet is not communicated over an air interface between the transmitting device and the receiving device.

17. The receiving device of claim 16, wherein the joint transmission is a type of coordinated multipoint (CoMP) transmission technique that comprises a simultaneous transmission of the data packet by the two or more relay nodes.

18. The method of claim 1, further comprising:
receiving, by the communications controller, an acknowledge (ACK) message from a first relay node of the two or more neighboring relay nodes before the first time period, the ACK message indicating that the first relay node successfully decoded the first data packet;
receiving, by the communications controller, a negative acknowledge (NACK) message from a second relay node of the two or more neighboring relay nodes before the first time period, the NACK message indicating that the second relay node was unable to successfully decode the first data packet;
determining, by the communications controller, that the communications node successfully decoded the first data packet upon receiving the first data packet from the first relay node at the first time period;
transmitting, by the communications controller, a second data packet and a second scheduling information to the two or more neighboring relay nodes in accordance with the cooperative operation after the first time period, wherein the second scheduling information specifies a second time period in which the two or more neighboring relay nodes are scheduled to simultaneously transmit the second data packet to the communications node using the CoMP transmission technique in accordance with the cooperative operation; and
sending, by the communications controller, an ignore indicator to the second relay node along with the second data packet, wherein the ignore indicator instructs the second relay node to ignore its inability to successfully decode the first data packet and to transmit the second data packet to the communications node at the second time period.

19. The transmission device of claim 12, wherein the programming further includes instructions to:
receive an acknowledge (ACK) message from a first relay node of the two or more neighboring relay nodes, the ACK message indicating that the first relay node successfully decoded the first data packet;
receive a negative acknowledge (NACK) message from a second relay node of the two or more neighboring relay nodes, the NACK message indicating that the second relay node was unable to successfully decode the first data packet;
determine that the receiving device successfully decoded the first data packet upon receiving the first data packet from the first relay node at the first time period;
transmit a second data packet and a second scheduling information to the two or more neighboring relay nodes, wherein the second scheduling information specifies a second time period in which the two or more neighboring relay nodes are scheduled to simultaneously transmit the second data packet to the receiving device using the CoMP transmission technique in accordance with the cooperative operation; and send an ignore indicator to the second relay node along with the second data packet, wherein the ignore indicator instructs the second relay node to ignore its inability to successfully decode the first data packet and to transmit the second data packet to the receiving device at the second time period.

20. The first relay node of claim 15, wherein the programming further includes instructions to:

transmit a negative acknowledge (NACK) message to the transmitting device, the NACK message indicating that the first relay node was unable to successfully decode the first data packet;

receive a second scheduling information and a second data packet accompanied by an ignore indicator from the transmitting device after the first time period, wherein the second scheduling information specifies a second time period in which the first relay node and the second relay node are scheduled to simultaneously transmit the second data packet to the receiving device using the CoMP transmission technique in accordance with the cooperative operation, and wherein the ignore indicator instructs the first relay node to ignore its inability to successfully decode the first data packet and to transmit the second data packet to the receiving device at the second time period; and coordinate, with the second relay node, a joint transmission of the second data packet to the receiving device during the second time period.

* * * * *